Patented June 6, 1933

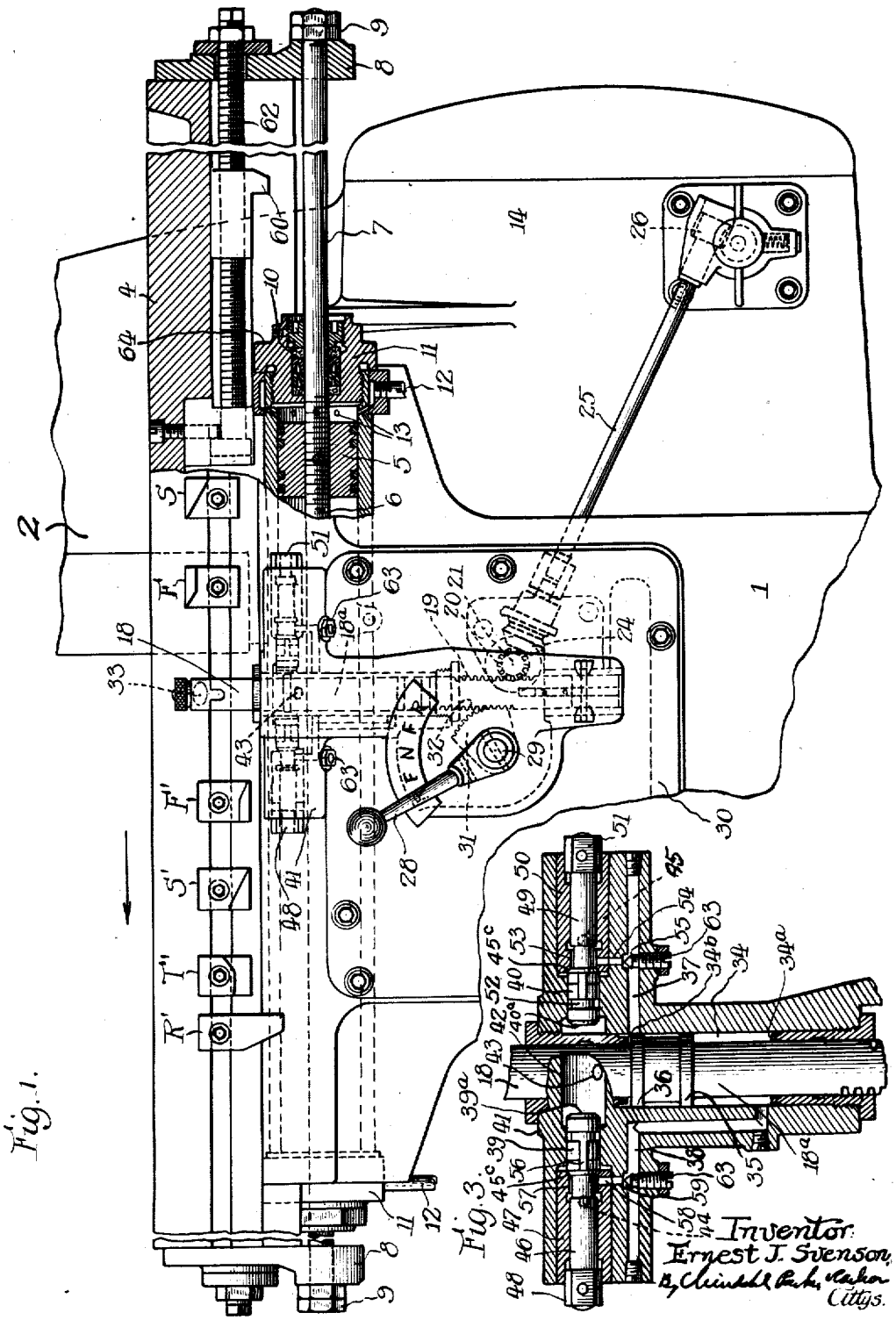

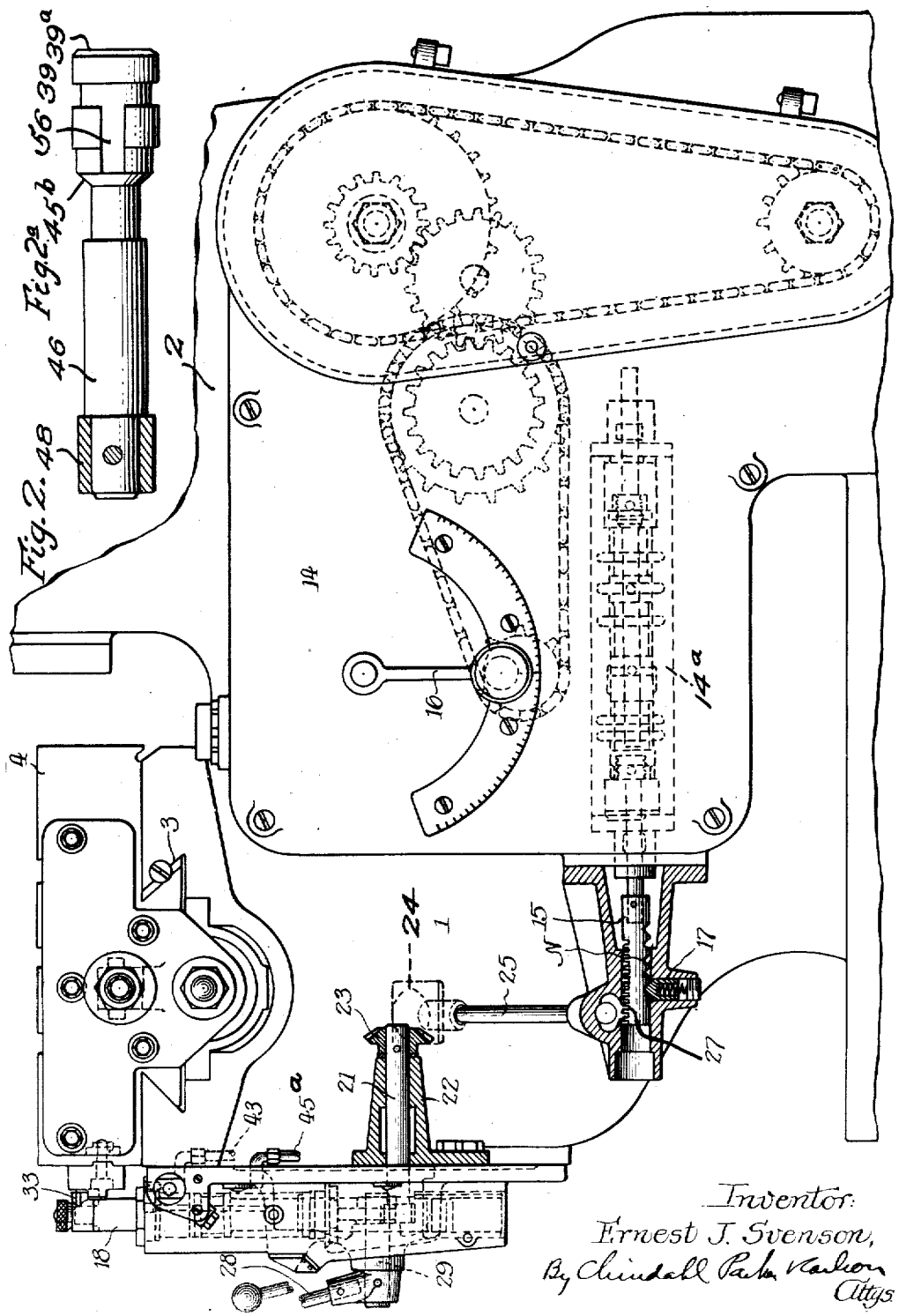

1,912,413

UNITED STATES PATENT OFFICE

ERNEST J. SVENSON, OF ROCKFORD, ILLINOIS, ASSIGNOR TO SUNDSTRAND MACHINE TOOL CO., OF ROCKFORD, ILLINOIS, A CORPORATION OF ILLINOIS

MILLING MACHINE

Application filed September 8, 1928. Serial No. 304,776.

The invention relates generally to machine tools and more particularly to improved mechanism for actuating and controlling the movements of the work support thereof.

It is the general object of the invention to provide novel and simplified means for controlling the movements of the work support of a machine embodying pressure fluid operated mechanism for actuating the support.

Another object is to provide in connection with a hydraulically operated work table, a control mechanism arranged to permit of convenient control of the table at feed and traverse speeds through various operating cycles, both manually and automatically.

Another object is to provide in a milling machine equipped with pressure fluid operated mechanism for actuating the table, a main control valve having five positions providing for feed and traverse in each direction and a central neutral point, and a trip mechanism arranged to be actuated mechanically by dogs on the table for changing the speed of movement thereof, and arranged to be actuated hydraulically for reversing the direction of movement.

Another object is to provide a control mechanism for such a five position valve comprising a vertical trip member slidably mounted adjacent a longitudinal edge of the table for vertical movement and having positions corresponding to those of the valve.

Another object is to provide such a trip mechanism together with auxiliary valve control means for shifting the trip member past its neutral point to reverse the table.

A further object is to provide a simplified control mechanism for a milling machine table which is of rugged construction, readily manipulated, and efficient in operation.

The present embodiment of the invention consists of a machine tool having a hydraulically operated work support and a multi-position main valve for controlling the movements of the table, the combination of a trip member mechanically connected to said valve and dog operated for obtaining certain movements thereof, auxiliary hydraulic mechanism including dog operated valves for shifting the main valve past neutral, and a manual control means for the main valve operable independently of the automatic trip mechanism.

Other objects and advantages will become apparent as the description proceeds.

In the drawings:

Figure 1 is a fragmentary front elevation partly in section, of a milling machine embodying the preferred form of the invention.

Fig. 2 is a side elevation thereof partly in section.

Fig. 2ª is a detail view of one of the dog-operated valve members.

Fig. 3 is an enlarged fragmental view, partly in section, of the auxiliary valve mechanism.

For purposes of disclosure I have illustrated in the drawings and will hereinafter describe in detail the preferred embodiment of the invention as incorporated in a milling machine but it is to be understood that I do not thereby intend to limit the invention to such a machine or to the specific form disclosed, it being contemplated that various changes may be made by those skilled in the art without departing from the spirit and scope of the appended claims.

In the drawings, 1 indicates the base or bed of a milling machine having a column 2 uprising from the rear portion thereof, which column may be adapted in any preferred manner (not shown) for supporting and driving a spindle for the cutting tool. The bed is provided with ways 3 extending transversely thereof on which a work support or table 4 is slidably mounted.

As shown most clearly in Fig. 1 the table 4 is arranged to be actuated by means of a piston 5 in a cylinder 6. The piston is supported on a rod 7 secured intermediate depending brackets 8 on the opposite ends of the table and the cylinder 6 is mounted rigidly on the bed 1. The rod 7 extends in both directions from the piston 5 so as to provide equal pressure surfaces on the opposite ends of the pistons, and has screw threaded ends engageable by nuts 9 adapted to be tightened to place the rod in tension. The opposite ends of the rod pass through suitable packing 10 in members 11 on the opposite ends of the cylinder.

The invention contemplates that the table 4 will be actuated by the admission and exhaust of pressure fluid to and from the opposite ends of the cylinder 6 through pipes 12 which connect with ports 13 and that the pressure fluid supply will be capable of providing fluid at a comparatively small volume and high pressure for the purpose of feeding the table at a slow or a cutting speed, and also to supply pressure fluid at a comparatively greater volume for moving the table rapidly during non-cutting operations at a traverse speed. Such pressure producing mechanism is preferably mounted in the bed 1 and is herein indicated by numeral 14 and embodies a main control valve 14ᵃ having an operating member 15. Since the pressure producing mechanism forms no part of the present invention, the invention pertaining particularly to the manual and automatic control of the main valve 14ᵃ of the mechanism which is provided with five positions corresponding to forward-traverse, forward-feed, stop, return-feed, and return-traverse movements of the table, the pressure producing mechanism and the main control valve are not disclosed in detail.

It is believed sufficient to state that the pressure producing mechanism is arranged to supply fluid at a small volume for feeding purposes and at a large volume for traverse purposes, the large volume being practically constant and the small volume being adjustable by means including a hand lever 16 to vary the feed rate. The five positions of the valve are indicated by the five-position detent device 17, it being contemplated that when the detent plunger is in the central notch N the main valve is in its neutral position and the table is stationary.

The invention provides both manual and automatic mechanism for actuating the main valve member 15. In the exemplary embodiment disclosed, this mechanism comprises a vertically slidable trip member 18 positioned at the front of the bed adjacent the longitudinal edge of the table. This trip member has on one side rack teeth 19 engageable by a pinion 20 secured to the forward end of a shaft 21. This shaft is rotatably mounted in a bracket 22 secured to the bed and at its rear end carries a bevel gear 23 which meshes with a corresponding bevel gear 24 secured to the adjacent end of an inclined shaft 25. The inclined shaft extends through the side of the bed and has a pinion 26 on its opposite end which meshes with rack teeth 27 formed on the valve member 15. It will be apparent that by these connections the trip member 18 has five operative positions corresponding to the five positions of the main valve member.

The manual control in its preferred form comprises a hand lever 28 secured to the forward end of a short shaft 29 which is rotatably mounted on a cover or housing plate 30 secured to the front of the bed. The rear end of the shaft 29 is provided with a gear segment 31 meshing with rack teeth 32 on the trip member 18 so that the hand lever also has five positions as indicated by the letters R—F—N—F—R corresponding to the five positions of the main valve member and to the respective movements imparted to the table when the main valve is in these positions. The hand lever in the exemplary form of the invention is arranged to be in a vertical position when the valve member is in neutral and the table is stationary, and when moved to either side of its vertical into a feed or traverse position the lever indicates the direction of movement of the table. Thus as shown in Fig. 1, the table would be moving toward the left at a traverse rate.

Assuming that the pressure producing apparatus is in operation so that the main valve controls the movements of the table, it will be apparent that the hand lever 28 may be operated manually to obtain feed or traverse of the table in either direction or to stop the table, the handle being conveniently operable by movement in a single plane, and inasmuch as the feed positions are intermediate the neutral and the rapid traverse positions, in shifting from neutral to rapid traverse the main valve necessarily passes through a feed position.

The upper end of the trip element 18 is provided with a projecting abutment 33 adapted to be engaged by suitable dogs secured to the table 4 for operating the main valve automatically during movement of the table. Such dogs may be arranged to shift the trip element from feed in one direction to traverse in the same direction or vice versa, or from feed or traverse to neutral, it being contemplated that auxiliary mechanism will be provided to shift the trip element past neutral to reverse the movement of the table. In the form illustrated herein, a dog F, which may be referred to as a feed dog, is arranged to engage the abutment 33 on the trip member when the table is moving toward the left (Fig. 1) at a traverse speed, i. e., return traverse, and to shift the trip member downwardly to its return feed position. A dog S which may be referred to as a stop dog is provided with a longer cam surface and is arranged to move the trip member 18 into its neutral position whether the table be moving at a traverse or feed rate toward the left.

Similarly with the trip plunger in its lower operating range, i. e., below its neutral point, wherein the table would be feeding or traversing toward the right (Fig. 1), a feed dog F' would shift the trip member from its traverse to its feed position and a stop dog S' may be provided to shift the trip member from its traverse or feed positions to neutral. If desired a dog T' may be used for the purpose of shifting the trip member from feed to traverse.

It will be readily apparent to those skilled in the art that with a trip mechanism such as illustrated and a suitable arrangement of dogs, various operating cycles may readily be obtained especially when this mechanism is supplemented by the automatic reversing means which will now be described.

The trip member 18 which is preferably somewhat cylindrical in form is positioned with its mid portion 18$^a$ passing through a bore in the housing plate 30 which forms a cylinder 34, annular flanges 35 and 36 on the trip member acting as pistons slidable in said cylinder. The flanges are so positioned on the trip element that when the element is in its lowermost or rapid return position, the flange 35 abuts the lower end 34$^a$ of the cylinder and when the trip element is in its uppermost or rapid approach position, the flange 36 abuts the upper end 34$^b$ of the cylinder. Thus if the plunger is in its upper feed position wherein the table feeds to the left and pressure fluid is admitted to the cylinder 34 above the plunger 36, as through the port 37, the plunger will be moved to its lowermost position and thereby effect a rapid movement of the table to the right, and similarly if the trip element is in its lower feed position wherein the table is feeding to the right and pressure fluid is admitted to the cylinder 34 below the plunger 35, as through the port 38, the trip element will be shifted to its uppermost position and the table will move rapidly to the left.

To attain such movements of the trip element the invention contemplates the use of fluid under pressure controlled by a pair of dog operated valve members 39 and 40 (Figs. 2$^a$ and 3) which are slidably mounted horizontally in a housing 41 positioned immediately below the table in front of the bed 1 and through the rear portion of which housing the trip element 18 passes. The housing 41 is provided with a central receiving chamber 42 having an intake pipe 43 suitably connected to the pressure fluid mechanism 14, and outlet or exhaust ports 44 and 45 suitably connected to an outlet pipe 45$^a$ (Fig. 2) which communicates with the pressure fluid mechanism. Each valve member has a conical surface 45$^b$ adapted to bear against a valve seat 45$^c$, said seat being intermediate the pressure chamber 42 and the exhaust port 44 or 45.

The valve member 39 is arranged to control the flow of pressure fluid to and from the cylinder 34 below the flange 35 and the valve member 40 is arranged to control the flow of pressure fluid to and from the cylinder above the flange 36. Normally the valve members are held in their closed position as shown in Fig. 8, the pressure fluid in the receiving chamber 42 acting against the inner ends 39$^a$ and 40$^a$ of the valve members to urge them outwardly against their seats 45$^c$.

The valve member 39 has an operating stem 46 extending outwardly through a bushing 47 in the housing 41 so that its outer end 48 is in the path of a reversing dog R'. Similarly the valve member 40 is provided with an operating stem 49 extending through a bushing 50 in the housing 41 so that its outer end 51 may be engaged by a similar dog on the table oppositely positioned. When the valve members 39 and 40 are seated, the exhaust ports 44 and 45 are open, the pressure in both ends of the cylinder 34 being thus relieved, so as to permit of easy operation of the trip element 18 by the handle 28 or the dogs on the table. When one of the valve members 39 and 40 is unseated by the corresponding dog on the table, the exhaust port for that valve member is blanked by the valve stem 46 or 49.

Assuming the trip member to be in its upper feed position, (or in the upper traverse position as shown in Fig. 3) wherein the table will be moving toward the left (Fig. 1), engagement of a dog with the outer end 51 of the valve stem 49 moves the valve member 40 inwardly away from its seat 45$^c$ and admits pressure fluid from the receiving chamber 42 through a longitudinal port 52 in the valve, a chamber 53 in the housing 41, a port 54, an adjustable orifice 55 and the port 37 into the upper end of the cylinder 34 to move the trip element 18 downwardly to its lower traverse position wherein the table is moved rapidly toward the right. Similarly when the table reaches the end of its movement toward the right and the dog R' engages the outer end 48 of the valve stem 46, the valve member 39 is unseated to admit pressure fluid from the receiving chamber 42 through a longitudinal port 56 in the valve member, a chamber 57 in the housing 41, a port 58, an adjustable orifice 59 and the port 38 to the lower end of the cylinder 34 to move the trip element upwardly to its uppermost position in which the table moves rapidly to the left. It will be apparent that as soon as the table reverses its movement and the dog R' is withdrawn from the end 48 of the valve stem, the valve member 39 due to the pressure of the fluid on the inner end 39$^a$ thereof returns to its normal position in which position the chamber 57 is connected to the exhaust chamber passage 44 thereby relieving the pressure in the cylinder 34 below the flange 35. Similarly the chamber 53 is connected to the exhaust passage by means of the port 45.

The invention in its preferred form also embodies means operable in conjunction with the reversing control mechanism to provide a positive or precision stop for the table. As illustrated herein this means comprises stop members 60 adjustably mounted on the table and arranged to engage an abutment 64 on the base to limit the movement of the table. Although the drawings show such a stop member only at the right hand end of the table (Fig. 1), it is contemplated that a duplicate device will be provided at the opposite end.

Preferably the stop member 60 is mounted on a screw-threaded rod 62 which is rotatably mounted on the table so that the stop member may be adjusted longitudinally to various strokes. In operation the adjacent reversing dog (not shown but oppositely formed compared to R') is so positioned that when the stop member 60 engages the abutment 64 to stop the table, the reversing dog has already actuated the valve stem 51 and during the time lag between the movement of the valve stem and the movement of the trip element 18, the cutter finishes the cut up to the precision stop. The time lag between the movement of the valve stem and trip element is adjustable by means of adjusting devices 63 for the orifices 55 and 59. In this way the cutter is permitted to clear the cut with the table stationary just prior to a reversal of movement.

It will be apparent from the foregoing that the invention not only provides a control mechanism simple in construction and extremely convenient and efficient in operation, but also one which is capable of being set up for all types of automatic and semi-automatic operating cycles and which may be manipulated readily by hand whether connected for automatic control or not. In addition the mechanism disclosed provides for an extremely accurate stopping of the table at the end of a cutting stroke.

I claim as my invention:

1. In a milling machine having a base, a table movably mounted thereon and pressure fluid operated mechanism for actuating said table including a multi-position control valve, the combination of a reciprocatory trip element mounted on said base for movement along a single path and connected to the valve, said trip element having a central neutral position and feed and traverse positions on each side of said neutral position spaced from each other along said path, dogs secured to said table arranged to shift said element by contact therewith to change the speed of said table means adapted to shift said element to reverse the table, and end dogs secured to said table arranged to control the operation of said last mentioned means.

2. A machine tool having, in combination, a movable support, a piston and cylinder for reciprocating said support at different speeds, and means for controlling the supply of pressure fluid to the cylinder comprising, a main valve, a vertically movable member connected to said valve and located adjacent to one longitudinal edge of said support, a first set of dogs on said support adapted to move said member up and down to change the speed of the support, auxiliary pressure-fluid operated means for moving said member up and down to reverse the support, means for controlling said auxiliary pressure operated means, and means on said support to operate said auxiliary control means.

3. A machine tool having, in combination, a movable support, a piston and cylinder for moving said support, and means for controlling the supply of pressure fluid to the cylinder comprising a main valve, a vertically movable member connected to actuate said valve and located adjacent to one longitudinal edge of said support, a first set of dogs on said support adapted to move said member up and down for changing the speed of the support, pressure-fluid operated means for moving said member up and down for reversing the support, two valves controlling the last mentioned means, and a second set of dogs on said support to operate the last-mentioned valves.

4. A machine tool having, in combination, a movable support, a piston and cylinder for moving said support, and means for controlling the supply of pressure fluid to the cylinder comprising a main valve, an operating member connected to said valve and located adjacent to one longitudinal edge of said support, a first set of dogs on said support adapted to move said member in opposite directions and to various points to change the speed of the support, a second piston and cylinder device for moving said member to the limit of its movement in opposite directions to reverse the support, two valves controlling said second piston and cylinder device and dogs on said support to operate the last-mentioned valves.

5. A machine tool having, in combination, a movable support, a piston and cylinder for moving said support, and means for controlling the supply of pressure fluid to the cylinder comprising a main valve, an operating member connected to said valve, means operating in timed relation to said support for moving said member in opposite directions and to various points, pressure-fluid means for moving said member to the limit of its movement in opposite directions, and means operating in timed relation to the support for operating the last-mentioned pressure-fluid means.

6. A machine tool having, in combination, a movable support, a piston and cylinder for moving said support, and means for controlling the supply of pressure fluid to the cylinder comprising a main valve, an operating member connected to said valve and located adjacent to one longitudinal edge of said support, pressure-fluid means for moving said member, a valve controlling the last-mentioned means, said last-mentioned valve having a stem, a dog on said support to operate said stem, and a stop on said support arranged to engage a stationary abutment after said dog has operated said stem.

7. In a machine tool having a reciprocatory support, means for reciprocating said support at feed and traverse rates, and means for controlling said reciprocating means including a movable control member operable to stop, reverse and change the speed of said support, the combination of mechanical means controlled by dogs on said support for moving said control member to stop or change the speed of said support, and pressure-fluid operated means controlled by additional dogs on said support for moving said element to reverse said support.

8. In a machine tool having a movable support, means for reciprocating said support at feed and traverse rates, and means for controlling said reciprocating means including a control member movable to a plurality of positions on each side of its mid-position, the combination of mechanical means controlled by a first dog for moving said member from any position on one side of said mid-position to any other position on the same side or to the mid-position to change the speed of the support, and pressure-fluid operated means controlled by a second dog for moving said member from any position on one side of the mid-position to a position on the other side of said mid-position to reverse the support.

9. In a machine tool having a movable support, means for reciprocating said support at feed and traverse rates, and means for controlling said reciprocating means including a control member movable to a plurality of positions for stopping, reversing and changing the speed of said support, the combination of a first means mechanically moving said control member during the movement of the support to the positions for stopping or controlling the speed of said support, a second means operating through pressure-fluid to move said control member to a position for reversing said support at both ends of the support movement, and a third means manually operated to move said control member to any of its positions.

10. In combination with a movable support and actuating mechanism for moving said support at feed and traverse rates, means including a control element movable along a single path and effective to determine the operation of said mechanism, said element having a neutral position, operating positions on one side of said neutral position and spaced from each other along said path wherein the support will move at feed and traverse rates in one direction, operating positions on the other side of said neutral position and spaced from each other along said path wherein the support will move at feed and traverse rates in the opposite direction, dogs on said support arranged to move said element to change the speed of movement of the support from an operating position on one side of said neutral position to another position on the same side or to the neutral position, power means for moving said element through said neutral position, means for controlling said power means and dogs on said support for actuating said last-mentioned means.

11. In combination with a reciprocating support and actuating mechanism for moving said support at feed and traverse rates, means including a control element vertically movable along a single path adjacent an edge of the support effective to determine the operation of said mechanism, said element having a central neutral position, operating positions above said neutral position and along said path wherein the support will move at feed and traverse rates in one direction, operating positions below said neutral position and along said path wherein the support will move at feed and traverse rates in the opposite direction, dogs on said support arranged to move said element when above its neutral position to another position above its neutral position or to its neutral position, dogs on said support arranged to move said element when below said neutral position to another position below its neutral position or to its neutral position, pressure fluid means to shift said element through said neutral position, valve means for controlling said pressure fluid and dogs on said support for actuating said last-mentioned means.

12. In a machine tool having a movable support, pressure fluid operated means for moving said support and means for controlling the movement of said support including a movable control member having a central stop position and operating positions on both sides of said stop position, the positions on one side being for movement of the support in one direction and the positions on the other side for movement in the opposite direction, the combination of a first set of dogs mounted on the support and having cam surfaces arranged to move said control member, the movement of the control member depending upon the shape of the cam surface and the continued movement of the support, a second set of dogs mounted on said support, and pressure-fluid means for moving said control member arranged to be set in operation by said second set of dogs and completing its operation independent of the continued movement of the support.

13. In a machine tool having a base, a support movably mounted thereon, means for moving said support and means for controlling the movement of said support including a control member mounted adjacent one longitudinal edge of said support for movement transversely of said support, the combination of a first dog mounted on said longitudinal edge of said support arranged to strike said control member for moving it and to change the speed of the support pressure fluid operated means for moving said control member to reverse the support comprising a cylinder mounted on said base surrounding said control member, collars mounted on said control member within said cylinder and constituting pistons for moving said member, means for controlling the flow of pressure fluid to said cylinder, and a second dog mounted on said support for operating said pressure fluid operated means.

14. In a machine tool having a base, a support movably mounted thereon, means for moving said support and means for controlling said moving means including a control member movably mounted adjacent said support, the combination of a first dog mounted on said support arranged to strike one end of said control member for moving it, a cylinder mounted on said base surrounding the middle portion of said member, pressure fluid operated means for moving said control member comprising a collar mounted on said control member within said cylinder and constituting a piston for moving said member, and valve means for controlling the flow of pressure fluid to said cylinder, a second dog mounted on said support for operating said valve means, and a hand lever pivoted on said base and having a connection with said control member for manually moving it.

15. In a machine tool having a base, a support movably mounted thereon, means for moving said support and means for controlling said moving means including a control member movably mounted adjacent said support, the combination of dogs mounted on said support arranged to strike said control member for moving it to change the feed of the support, pressure fluid operated means for moving said control member to reverse the support comprising a cylinder mounted on said base surrounding said control member, means mounted on said control member within said cylinder and constituting a piston for moving said member and a pair of valves controlling the flow of pressure fluid to said cylinder for movement of said control member in the respective directions, and end dogs mounted on said support for actuating said valves, said valves being connected to relieve the pressure in said cylinder, when the support has moved said end dogs out of actuating position, to permit the first-mentioned dogs to freely move the control member.

16. In a machine tool having a base, a support movably mounted thereon, means for reciprocating said support at different rates and means for controlling said reciprocating means including a control member movably mounted adjacent said support, the combination of a first mechanism for moving said control member to change the speed of the support, and a second mechanism for moving said control member to reverse the support, one of said mechanisms comprising a first set of dogs mounted on said support arranged to strike said control member for moving it, the other of said mechanisms comprising a cylinder mounted on said base surrounding said control member, means mounted on said control member within said cylinder and constituting a piston for moving said member, a pair of valves controlling the flow of fluid pressure to the respective ends of said cylinder for moving the control member in opposite directions, and a second set of dogs mounted on said support for moving said valves selectively to a position permitting the flow of pressure fluid to the opposite ends of cylinder.

17. In a machine tool having a base, a support movably mounted on said base, a cylinder and piston for reciprocating the support at different rates, and a main valve for controlling the flow of fluid to the cylinder, the combination of a handle for manually moving said main valve, means for automatically controlling certain movements of the main valve to change the speed of the support including a first dog on said support for mechanically actuating the valve, auxiliary valve mechanism connected to control other movements of said main valve to reverse the direction of the support, and means for automatically actuating said auxiliary valve mechanism, said auxiliary valve mechanism automatically returning to normal position after such actuation and as the direction of movement of said support is reversed, and being connected to relieve said main valve of unbalanced pressure, when in normal position, so that said main valve may be thereafter freely moved manually by said handle while connected for automatic control.

18. In a machine tool having a base, a support movably mounted thereon, a cylinder and piston for reciprocating said support at different speeds, and a main valve for controlling the flow of fluid to the cylinder, the combination of a handle for manually moving said main valve, an element connected to operate said main valve, a first set of dogs on said support for automatically operating said control element to change the speed of the support, two auxiliary valves connected to control the movements of said main valve element to reverse the direction of support movement, and a second set of dogs on the support for automatically operating said auxiliary valves, said auxiliary valves after displacement by said dogs moving automatically as the direction of movement of said support is reversed to positions in which they equalize the opposed pressure on said main valve element, whereby said main valve may be thereafter freely moved manually by said handle while connected for automatic control.

19. In a machine tool having a base, a support movably mounted thereon, hydraulically operated means for reciprocating said support at different rates, and a main valve for controlling the flow of fluid to said hydraulically operated means, the combination of, a first set of dogs on said support for moving said main valve to change the speed of movement of the support, two auxiliary valves connected to control the movement of said main valve to reverse the support at the end of its movement in each direction, and a second set of dogs on the support for automatically operating the auxiliary valves, said auxiliary valves being automatically returned to normal position after support reversal to permit said main valve to be actuated by dogs of said first set.

In testimony whereof, I have hereunto affixed my signature.

ERNEST J. SVENSON.

CERTIFICATE OF CORRECTION.

Patent No. 1,912,413.　　　　　　　　　　　　　　　　　　　　June 6, 1933.

ERNEST J. SVENSON.

It is hereby certified that error appears in the printed specification of the above numbered patent requiring correction as follows: Page 5, line 108, claim 11, after "fluid" insert "means"; page 6, line 12, claim 13, strike out the word "and", and line 13, after "support" insert ", and"; same page, lines 34 and 35, claim 14, strike out the words "pressure fluid operated means for moving said control member comprising" and insert the same before "a" in line 32; and line 52, claim 15, for "feed" read "speed"; and that the said Letters Patent should be read with these corrections therein that the same may conform to the record of the case in the Patent Office.

Signed and sealed this 8th day of August, A. D. 1933.

(Seal)

M. J. Moore.
Acting Commissioner of Patents.

connected to control the movements of said main valve element to reverse the direction of support movement, and a second set of dogs on the support for automatically operating said auxiliary valves, said auxiliary valves after displacement by said dogs moving automatically as the direction of movement of said support is reversed to positions in which they equalize the opposed pressure on said main valve element, whereby said main valve may be thereafter freely moved manually by said handle while connected for automatic control.

19. In a machine tool having a base, a support movably mounted thereon, hydraulically operated means for reciprocating said support at different rates, and a main valve for controlling the flow of fluid to said hydraulically operated means, the combination of, a first set of dogs on said support for moving said main valve to change the speed of movement of the support, two auxiliary valves connected to control the movement of said main valve to reverse the support at the end of its movement in each direction, and a second set of dogs on the support for automatically operating the auxiliary valves, said auxiliary valves being automatically returned to normal position after support reversal to permit said main valve to be actuated by dogs of said first set.

In testimony whereof, I have hereunto affixed my signature.

ERNEST J. SVENSON.

CERTIFICATE OF CORRECTION.

Patent No. 1,912,413.   June 6, 1933.

ERNEST J. SVENSON.

It is hereby certified that error appears in the printed specification of the above numbered patent requiring correction as follows: Page 5, line 108, claim 11, after "fluid" insert "means"; page 6, line 12, claim 13, strike out the word "and", and line 13, after "support" insert ", and"; same page, lines 34 and 35, claim 14, strike out the words "pressure fluid operated means for moving said control member comprising" and insert the same before "a" in line 32; and line 52, claim 15, for "feed" read "speed"; and that the said Letters Patent should be read with these corrections therein that the same may conform to the record of the case in the Patent Office.

Signed and sealed this 8th day of August, A. D. 1933.

(Seal)

M. J. Moore.
Acting Commissioner of Patents.

CERTIFICATE OF CORRECTION.

Patent No. 1,912,413.                                                                     June 6, 1933.

ERNEST J. SVENSON.

It is hereby certified that error appears in the printed specification of the above numbered patent requiring correction as follows: Page 5, line 108, claim 11, after "fluid" insert "means"; page 6, line 12, claim 13, strike out the word "and", and line 13, after "support" insert ", and"; same page, lines 34 and 35, claim 14, strike out the words "pressure fluid operated means for moving said control member comprising" and insert the same before "a" in line 32; and line 52, claim 15, for "feed" read "speed"; and that the said Letters Patent should be read with these corrections therein that the same may conform to the record of the case in the Patent Office.

Signed and sealed this 8th day of August, A. D. 1933.

(Seal)                                                       M. J. Moore.
                                                          Acting Commissioner of Patents.